US012806770B2

(12) United States Patent
Kim et al.

(10) Patent No.: US 12,806,770 B2
(45) Date of Patent: Nov. 24, 2026

(54) APPARATUS FOR CONTROLLING ROBOT AND METHOD THEREOF

(71) Applicants: Hyundai Motor Company, Seoul (KR); Kia Corporation, Seoul (KR); UIF (University Industry Foundation), Yonsei University, Seoul (KR)

(72) Inventors: Tae Ho Kim, Hwaseong-si (KR); Yu Jung Chae, Hwaseong-si (KR); Eun Ji Kim, Hwaseong-si (KR); Kyong Ho Lee, Seoul (KR); Seok Ju Hwang, Ansan-si (KR); Tae Jung Heo, Seoul (KR)

(73) Assignees: Hyundai Motor Company, Seoul (KR); Kia Corpration, Seoul (KR); UIF (University Industry Foundation), Yonsei University, Seoul (KR)

( * ) Notice: Subject to any disclaimer, the term of this patent is extended or adjusted under 35 U.S.C. 154(b) by 89 days.

(21) Appl. No.: 18/928,593

(22) Filed: Oct. 28, 2024

(65) Prior Publication Data

US 2025/0303559 A1 Oct. 2, 2025

(30) Foreign Application Priority Data

Apr. 1, 2024 (KR) ........................ 10-2024-0044346

(51) Int. Cl.
*B25J 9/16* (2006.01)
*B25J 11/00* (2006.01)

(52) U.S. Cl.
CPC ............. *B25J 9/163* (2013.01); *B25J 9/1602* (2013.01); *B25J 11/008* (2013.01); *G05B 2219/32335* (2013.01)

(58) Field of Classification Search
CPC ........ B25J 9/163; B25J 9/1602; B25J 11/008; G05B 2219/32335
See application file for complete search history.

(56) References Cited

U.S. PATENT DOCUMENTS 11,163,952 B2 11/2021 Gentile et al.
2013/0211591 A1* 8/2013 Suh .......................... B25J 9/161 700/258

(Continued)

FOREIGN PATENT DOCUMENTS

JP 5617193 B2 11/2014
JP 2023018893 A 2/2023

(Continued)

OTHER PUBLICATIONS

Machine translation of KR-100905523-B1 (Year: 2009).*

(Continued)

*Primary Examiner* — Mohamad O El Sayah
(74) *Attorney, Agent, or Firm* — Slater Matsil, LLP

(57) ABSTRACT

A robot control apparatus can include a memory that stores computer-executable instructions and at least one processor that executes the instructions by accessing the memory. The at least one processor can apply event information about activity of a user, which can be identified from user activity data perceived from a robot, and context information about time and space in which the activity occurs, to a knowledge graph formed by a relation between an event instance regarding the event information and a context instance regarding the context information, obtain user intent data regarding intent of the activity by applying the event instance among instances included in the knowledge graph to a rule creation model for creating information about the intent of the activity, and control the robot such that the robot (Continued)

```
Event:
Type(event) IN [Touching]
Condition:
Count(type(prevents) == Touching) >= 2
AND (total duration of activities that occurred
in place is greater than or equal to specific time(30
seconds))
And (instance of Car class is present in place)
Type(hasLocation) == ExhibitionArea
Action:
Create InspectingCarExterior event
```

performs a target task related to expected activity, which can follow the activity, based on the user intent data.

20 Claims, 13 Drawing Sheets

(56) References Cited

U.S. PATENT DOCUMENTS

| | | | | |
|---|---|---|---|---|
| 2019/0171945 | A1* | 6/2019 | Ganhotra | G06F 16/951 |
| 2021/0358579 | A1 | 11/2021 | Chen et al. | |
| 2022/0328038 | A1* | 10/2022 | Otani | G10L 15/22 |
| 2023/0085938 | A1 | 3/2023 | He et al. | |

FOREIGN PATENT DOCUMENTS

| | | | | |
|---|---|---|---|---|
| KR | 100905523 B1 * | 7/2009 | | |
| KR | 102140585 B1 * | 8/2020 | | G06F 16/367 |
| WO | WO-2020026826 A1 * | 2/2020 | | G05D 1/02 |

OTHER PUBLICATIONS

Machine translation of KR-102140585-B1 (Year: 2020).*
Machine translation of WO-2020026826-A1 (Year: 2020).*
Chi Han et al., “Logical Entity Representation In Knowledge-Graphs for Differentiable Rule Learning,” Published as a conference paper at ICLR 2023, arXiv:2305.12738, May 22, 2023, Total p. 20.
Doo Soo Chang et al., “Ontology-Based Knowledge model for Human-Robot Interactive Services,” The 35th Annual ACM/SIGAPP Symposium on Applied Computing (SAC •20), pp. 2029-2038, Mar. 30-Apr. 3, 2020, Brno, Czech Republic, Total p. 10.
Hwawoo Jeon et al., “An Ontology-Based Home Care Service Robot for Persons with Dementia,” Proceedings of the 27th IEEE International Symposium on Robot and Human Interactive Communication, Aug. 27-31, 2018, Nanjing, China, Total p. 06.
Kewei Cheng et al., “Neural Compositional Rule Learning for Knowledge Graph Reasoning,” Published as a conference paper at ICLR 2023, arXiv:2303.03581, Mar. 7, 2023, Total p. 18.

* cited by examiner

```
    Event:
    Type(event) IN [Touching]
    Condition:
    Count(type(prevents) == Touching) >= 2
    AND (total duration of activities that occurred
in place is greater than or equal to specific time(30
seconds))
    And (instance of Car class is present in place)
    Type(hasLocation) ==  ExhibitionArea
    Action:
    Create InspectingCarExterior event
```

FIG.2B

APPARATUS FOR CONTROLLING ROBOT AND METHOD THEREOF

CROSS-REFERENCE TO RELATED APPLICATIONS

This application claims the benefit of priority to Korean Patent Application No. 10-2024-0044346, filed in the Korean Intellectual Property Office on Apr. 1, 2024, the entire contents of which are incorporated herein by reference.

TECHNICAL FIELD

The present disclosure relates to a robot control apparatus and a method thereof.

BACKGROUND

With the development of artificial intelligence and robot technology, the demand and interest in service robots are increasing. In particular, a technology may be provided to provide services to users (e.g., customers) in a non-face-to-face environment using service robots. Accordingly, the need for intelligent service robots, which are capable of performing tasks at an advanced level close to that of existing humans, is increasing. In particular, a robot is required to infer and provide a service, which a customer needs, based on the customer's activity and situational information within a specific space.

To solve these problems, there is a need to develop a technology for controlling robots by inferring human activity information (e.g., walking) step by step based on the customer's activity and the situation information, and finally inferring human intent.

SUMMARY

The present disclosure relates to a robot control apparatus and a method thereof, and more specifically, relates to a technology for inferring a user's intent from the user's activity. Embodiments of the present disclosure can solve the above-mentioned problems occurring in the prior art while advantages achieved by the prior art can be maintained intact.

An embodiment of the present disclosure can provide a robot control apparatus that may provide excellent effects by using inference of considering a user's activity, and a situation in which the activity occurs, compared to the effect of inferring intent by using only the user's activity by inferring the user's intent through a rule creation model based on the event instance and context instance included in a knowledge graph, and a method thereof.

An embodiment of the present disclosure can provide a robot control apparatus that can reduce the time and cost required to obtain domain knowledge and, at the same time, combining knowledge-driven and data-driven approaches to create expressive rules by updating an event-condition-action (ECA) rule based on the output of a rule mining model and a knowledge graph, and a method thereof.

An embodiment of the present disclosure can provide a robot control apparatus that may increase intent perception performance through the discovery of previously undiscovered rules by inferring the user's intent based on user intent data obtained from the ECA rule and additional user intent data obtained from the updated ECA rule, rather than inferring the user's intent based on the output of the rule mining model.

Technical problems to be solved by embodiments of the present disclosure are not necessarily limited to the aforementioned problems, and other technical problems not mentioned herein can be also solved by an embodiment of the present disclosure, as can be understood from the following description by those skilled in the art to which the present disclosure pertains.

According to an embodiment of the present disclosure, a robot control apparatus may include a memory that stores computer-executable instructions and at least one processor that executes the instructions by accessing the memory. The at least one processor may apply event information about activity of a user, which can be identified from user activity data perceived from a robot, and context information about time and space in which the activity occurs, to a knowledge graph formed by a relation between an event instance regarding the event information and a context instance regarding the context information, may obtain user intent data regarding intent of the activity by applying the event instance among instances included in the knowledge graph to a rule creation model for creating information about the intent of the activity, and may control the robot such that the robot performs a target task related to expected activity, which can follow the activity, based on the user intent data.

In an embodiment, the at least one processor may identify a set, selected, or predetermined event-condition-action (ECA) rule from the rule creation model based on applying the event instance to the rule creation model, may obtain a condition regarding the event instance by applying the event instance to the ECA rule, and may obtain the user intent data by applying the context instance paired with the event instance to the condition.

In an embodiment, the at least one processor may identify a neural compositional rule learning (NCRL)-based rule mining model that can generate the user intent data regardless of the context instance based on the event instance among instances included in the knowledge graph from the rule creation model, and may update the ECA rule based on an output of the rule mining model and the knowledge graph.

In an embodiment, the at least one processor may obtain activity sequence data regarding the event instance from the rule mining model, may obtain at least one candidate context instance related to the activity sequence data from the knowledge graph, and may update the ECA rule based on the activity sequence data and the at least one candidate context instance.

In an embodiment, the at least one processor may identify a first candidate context instance and a second candidate context instance different from the first candidate context instance from the at least one candidate context instance, may determine a first count, which can be a number of targets satisfying combination of a place included in the first candidate context instance and the activity sequence data, may determine a second count, which can be a number of targets satisfying combination of a place included in the second candidate context instance and the activity sequence data, and may determine one of the first candidate context instance or the second candidate context instance as a target context instance regarding the activity sequence data based on comparing the first count with the second count.

In an embodiment, the at least one processor may update the ECA rule by inserting a relation between the activity sequence data and the target context instance into the ECA rule based on the target context instance regarding the target activity sequence data being determined.

In an embodiment, the at least one processor may obtain an additional condition regarding an instance of the event information by applying the instance of the event information to the ECA rule based on the ECA rule being updated, and may obtain additional user intent data different from the user intent data by applying an instance regarding context information paired with the event information to the additional condition.

In an embodiment, the at least one processor may determine a target task related to the expected activity based on the user intent data and the additional user intent data, and may control the robot such that the robot performs the target task.

In an embodiment, the at least one processor may generate resource description framework (RDF) data, which can include a relation between the event information and the context information and which can be in a data format compatible with ontology of the knowledge graph, and may convert the RDF data into the event instance and the context instance and store the event instance and the context instance in the knowledge graph.

According to an embodiment of the present disclosure, a robot control method may include applying event information about activity of a user, which can be identified from user activity data perceived from a robot, and context information about time and space in which the activity occurs, to a knowledge graph formed by a relation between an event instance regarding the event information and a context instance regarding the context information, obtaining user intent data regarding intent of the activity by applying the event instance among instances included in the knowledge graph to a rule creation model for creating information about the intent of the activity, and controlling the robot such that the robot can perform a target task related to expected activity, which can follow the activity, based on the user intent data.

In an embodiment, the robot control method may further include identifying a set, selected, or predetermined ECA rule from the rule creation model based on applying the event instance to the rule creation model, obtaining a condition regarding the event instance by applying the event instance to the ECA rule, and obtaining the user intent data by applying the context instance paired with the event instance to the condition.

In an embodiment, the obtaining of the user intent data may include identifying a NCRL-based rule mining model that generates the user intent data regardless of the context instance based on the event instance among instances included in the knowledge graph from the rule creation model, and updating the ECA rule based on an output of the rule mining model and the knowledge graph.

In an embodiment, the obtaining of the user intent data may include obtaining activity sequence data regarding the event instance from the rule mining model, obtaining at least one candidate context instance related to the activity sequence data from the knowledge graph, and updating the ECA rule based on the activity sequence data and the at least one candidate context instance.

In an embodiment, the obtaining of the user intent data may include identifying a first candidate context instance and a second candidate context instance different from the first candidate context instance from the at least one candidate context instance, determining a first count, which can be a number of targets satisfying combination of a place included in the first candidate context instance and the activity sequence data, determining a second count, which can be a number of targets satisfying combination of a place included in the second candidate context instance and the activity sequence data, and determining one of the first candidate context instance or the second candidate context instance as a target context instance regarding the activity sequence data based on comparing the first count with the second count.

In an embodiment, the obtaining of the user intent data may include updating the ECA rule by inserting a relation between the activity sequence data and the target context instance into the ECA rule based on the target context instance regarding the target activity sequence data being determined.

In an embodiment, the obtaining of the user intent data may include obtaining an additional condition regarding an instance of the event information by applying the instance of the event information to the ECA rule based on the ECA rule being updated, and obtaining additional user intent data different from the user intent data by applying an instance regarding context information paired with the event information to the additional condition.

In an embodiment, the controlling of the robot may include determining a target task related to the expected activity based on the user intent data and the additional user intent data, and controlling the robot such that the robot performs the target task.

In an embodiment, a robot control method may further include generating RDF data, which includes a relation between the event information and the context information and which is in a data format compatible with ontology of the knowledge graph, and converting the RDF data into the event instance and the context instance and storing the event instance and the context instance in the knowledge graph.

BRIEF DESCRIPTION OF THE DRAWINGS

The above and other features and advantages of the present disclosure can be more apparent from the following detailed description taken in conjunction with the accompanying drawings, in which:

FIG. 2B is an example definition of an ECA rule, according to an embodiment of the present disclosure;

Figure 1:
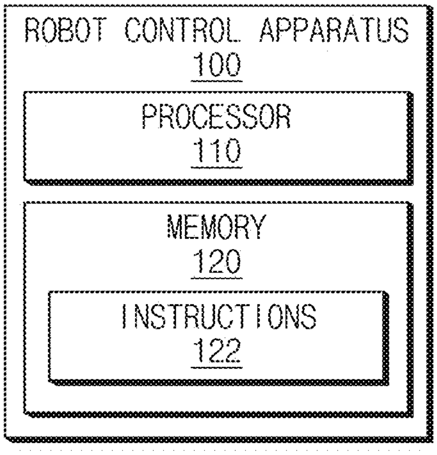
FIG. 1 is a diagram illustrating a robot control apparatus, according to an embodiment of the present disclosure.

With regard to description of drawings, same or similar components can be marked by same or similar reference signs.

DETAILED DESCRIPTION OF ILLUSTRATIVE EMBODIMENTS

Hereinafter, some example embodiments of the present disclosure will be described in detail with reference to the accompanying drawings. In describing the example embodiments of the present disclosure, detailed descriptions associated with well-known functions or configurations can be omitted when they may make subject matters of the present disclosure unnecessarily obscure. Those of ordinary skill in the art can recognize that modification, equivalent, and/or alternative on the various example embodiments described herein may be variously made without departing from the scopes and spirit of the present disclosure.

In describing elements of an embodiment of the present disclosure, the terms "first," "second," "A," "B," "(a)," "(b)," and the like, may be used herein. These terms can be used merely to distinguish one element from another element, but do not necessarily limit the corresponding elements irrespective of the nature, order, or priority of the corresponding elements. Furthermore, unless otherwise defined, terms including technical and scientific terms used herein can be interpreted as is customary in the art to which the present disclosure belongs. It can be understood that terms used herein can be interpreted as including a meaning that is consistent with their meaning in the context of the present disclosure and the relevant art. For example, the terms, such as "first", "second", and the like, used herein may refer to various components of various embodiments of the present disclosure, but do not necessarily limit the elements. For example, "a first user device" and "a second user device" may indicate different user devices regardless of the order or priority thereof. For example, without departing the scopes of the present disclosure, a first complement may be referred to as a second component, and similarly, a second complement may be referred to as a first complement.

In this specification, the expressions "possess", "may possess", "include" and "comprise", or "may include" and "may comprise" used herein indicate existence of corresponding features (e.g., elements such as numeric values, functions, operations, or components) but do not exclude presence of additional features.

It can be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) can be present. In contrast, when an element (e.g., a first element) is referred to as being "directly coupled with/to" or "directly connected to" another element (e.g., a second element), it can be understood that there are no intervening element (e.g., a third element).

According to the situation, the expression "configured to" used herein may be used as, for example, the expression "suitable for", "having the capacity to", "designed to", "adapted to", "made to", or "capable of".

The term "configured to" does not necessarily mean only "specifically designed to" in hardware. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) that performs corresponding operations by executing one or more software programs that are stored in a memory device. The terms used in the specification can be used merely to describe a specific example embodiment and are not necessarily intended to limit the scope of the present disclosure. The terms of a singular form may include plural forms unless otherwise specified. Terms used herein, which include technical or scientific terms, may include a same meaning that is generally understood by a person skilled in the art. Terms that are defined in a dictionary and commonly used can be interpreted as is customary in the relevant related art. In some cases, even though terms are terms that are defined in the specification, they may not be interpreted to exclude other embodiments of the present disclosure.

In the present disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Moreover, in describing a component of an embodiment of the present disclosure, the expressions at least one of "A or B", "at least one of A and B", "at least one of A or B", "A, B, or C", "at least one of A, B, and C", or "at least one of A, B, or C, or any combination thereof" may include any and all combinations of one or more of the associated listed items. In particular, expressions "at least one of A, B, or C, or any combination thereof" may include A, B, or C, or any combination thereof such as AB, ABC, or the like.

Hereinafter, example embodiments of the present disclosure will be described in detail with reference to FIGS. 1 to 10.

FIG. 1 is a diagram illustrating a robot control apparatus, according to an embodiment of the present disclosure.

According to an embodiment, a robot control apparatus 100 may include a processor 110 and a memory 120 including instructions 122, any combination of or all of which may be in plural or may include plural components thereof.

The robot control apparatus 100 may indicate an apparatus that controls a robot by inferring a user's intent through the user's activity and a situation in which the activity occurs. For example, the robot control apparatus 100 may receive, from the robot, user activity data including the user's activity and the situation in which the activity occurs. The user may include a person perceived by the robot through a perception module. Moreover, the user's intent may include the user's thoughts (i.e., what the user wants to do) or expected activity (e.g., a secondary activity following at a point time of primary activity) based on the user's activity (e.g., primary activity) perceived by the robot.

The robot control apparatus 100 may apply the user activity data to a knowledge graph. In detail, to infer or obtain user intent from the user activity data, the robot control apparatus 100 may utilize the knowledge graph. Afterward, the robot control apparatus 100 may obtain user intent data regarding the intent of activity by applying information about the user activity data described above among pieces of information included in the knowledge graph to a rule creation model. The robot control apparatus 100 may control the robot based on the user intent data such that the robot performs a target task related to the user's intent. The knowledge graph may indicate a knowledge base that is capable of being expressed by using a graphical description capable of being expressed visually. The knowledge graph in the robot control apparatus 100 may include information in the form of at least one of nodes, knowledge, clusters, topics, subtopics, or keywords, or any combination thereof.

As will be described later, the robot control apparatus 100 may apply an instance included in the knowledge graph to the rule creation model. The robot control apparatus 100 may obtain user intent data by using an output of the rule creation model. Furthermore, the robot control apparatus 100 may update the rule creation model to additionally obtain the user intent data. The robot control apparatus 100 may obtain additional user intent data by using an output of the updated rule creation model. The robot control apparatus 100 may determine expected activity based on the user intent data and the additional user intent data. The robot control apparatus 100 may control the robot such that the robot performs a target task related to the determined expected activity.

The processor 110 may execute software and may control at least one other component (e.g., a hardware and/or software component) connected to the processor 110. The processor 110 may also perform various data processing or operations. For example, the processor 110 may store the user activity data and the user intent data in the memory 120.

For reference, the processor 110 may perform all operations performed by the robot control apparatus 100. Therefore, for convenience of description in this specification, an operation performed by the robot control apparatus 100 are mainly described as an operation performed by the processor 110. Furthermore, for convenience of description in this specification, the processor 110 is mainly described as a single processor, but is not limited thereto. For example, the robot control apparatus 100 may include at least one processor. The at least one processor may perform all operations related to controlling the robot by inferring the user's intent through the user's activity and the situation in which the activity occurs.

The memory 120 may temporarily and/or permanently store various data and/or information required to perform an operation of controlling the robot by inferring the user's intent through the user's activity and the situation in which the activity occurs. For example, the memory 120 may store the user activity data, the user intent data, the knowledge graph, and the rule creation model.

The robot control apparatus 100 may further include a communication device (e.g., not shown). For example, the communication device may support communication between the robot control apparatus 100 and the robot. For example, the communication device may include one or more components for communicating between the robot control apparatus 100 and the robot. For example, the communication device may include a short range wireless communication device, a microphone, or the like. In this case, short-range communication technologies include wireless LAN (Wi-Fi), Bluetooth, ZigBee, Wi-Fi Direct (WFD), ultra-wideband (UWB), infrared data association (IrDA), Bluetooth Low Energy (BLE), and near field communication (NFC), and the like, but are not limited thereto.

Figure 2A:
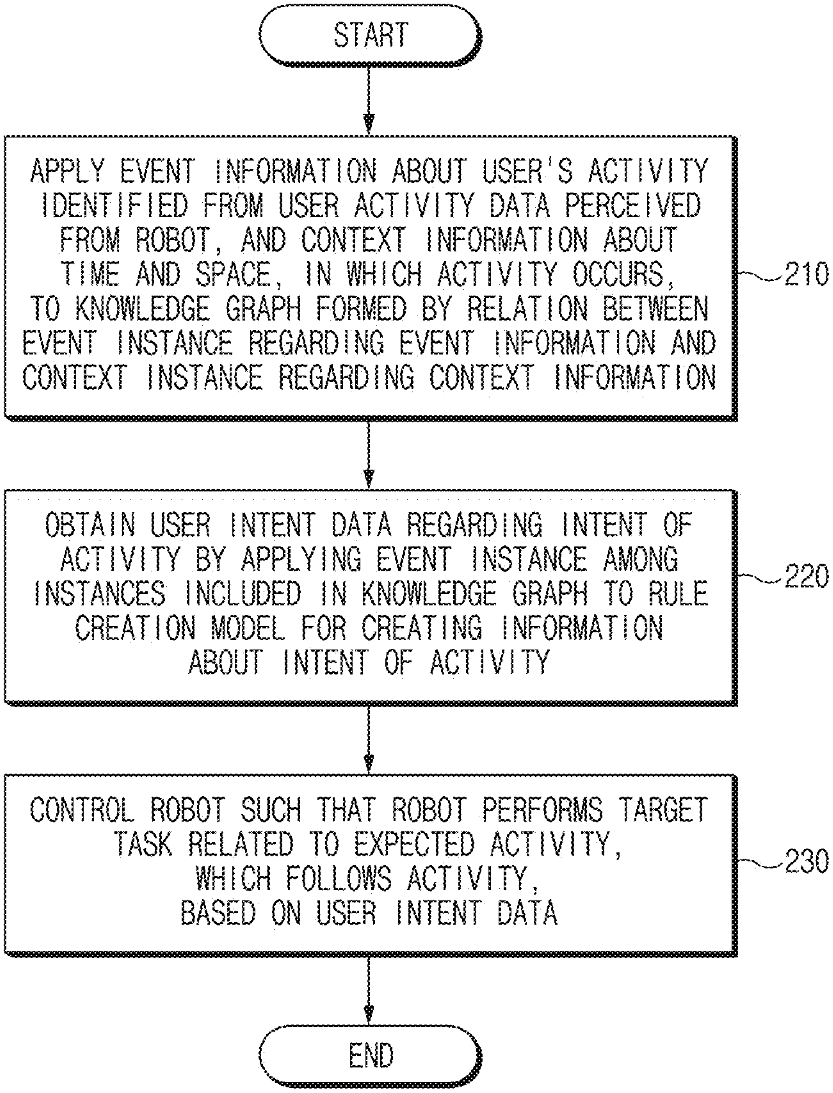
FIG. 2A is a flowchart for describing a method for controlling a robot, according to an embodiment of the present disclosure.

FIG. 2A is a flowchart for describing a method for controlling a robot, according to an embodiment of the present disclosure.

In operation 210, a robot control apparatus (e.g., the robot control apparatus 100 in FIG. 1) according to an embodiment may apply event information about a user's activity identified from user activity data perceived from a robot, and context information about time and space, in which the activity occurs, to a knowledge graph formed by a relation between an event instance regarding the event information and a context instance regarding the context information. For example, when a robot perceives a walking user, the user activity data may include event information about a user's walking activity. In addition, the user activity data may include context information about time and space in which the user's walking activity occurs. Afterward, the robot control apparatus may create an event instance from the event information and may create the context instance from the context information.

With regard to the instances, data stored in the knowledge graph may be expressed as classes and instances. For example, when the robot perceives a walking user at a target time at a target place, the robot control apparatus may create a user instance, a target place instance, a target time instance, and a walking activity instance. For example, the event instance may include the walking activity instance. The context instance may include the user instance, the target place instance, and the target time instance. Furthermore, the walking activity instance may be inherited from an activity class. The user instance may be inherited from a user class. The target place instance may be inherited from a place class. The target time instance may be inherited from a time class.

In operation 220, the robot control apparatus may obtain user intent data regarding the intent of the activity by applying the event instance among instances included in the knowledge graph to a rule creation model for creating information about the intent of the activity. For example, the robot control apparatus may identify the event instance related to event information about the user's activity identified from the user activity data among the instances included in the knowledge graph. For example, the rule creation model may include a set, selected, or predetermined ECA rule. For example, FIG. 2B shows an example of a definition of an ECA rule.

For example, the ECA rule may indicate a rule for outputting a newly created action through each relation between an event, a condition, and an action. In detail, when an event is entered, the robot control apparatus may determine a condition related to the input event through the ECA rule. The event may indicate the trigger of a rule. In other words, the event may include a set of user activities perceived by the robot. The event may include any perceivable unit activity, such as walking or standing, or complex user activity, such as getting into a car or inspecting a place in detail. When a condition for an event is determined, the robot control apparatus may output a set, selected, or predetermined action through the ECA rule. The condition may indicate a specific situation in which a rule is triggered. When the rule's task is triggered, the relevant condition may need to be satisfied. The condition may be implemented as a query of the knowledge graph for determining whether a specific triple is present.

For example, when the robot control apparatus identifies an event instance such as 'touching' in the knowledge graph and then enters the identified event instance into the ECA rule, the robot control apparatus may identify the number of occurrences of an input event, the duration of the input event, and a place where the input event occurs, through the ECA rule. When the above-described conditions are satisfied, the robot control apparatus may output an action such as 'inspecting car exterior' (e.g., inspecting the exterior of a car) as an action for an event such as 'touching'.

In operation 230, the robot control apparatus may control the robot such that the robot performs a target task related to expected activity, which follows the activity, based on the user intent data. For example, the robot control apparatus may obtain the user intent data such as 'inspecting car exterior' through the ECA rule. The robot control apparatus may determine the target task regarding the expected activity, which follows the activity, as 'a task of approaching the user and suggesting a car description' based on the user intent data such as 'inspecting car exterior'.

Figure 3:
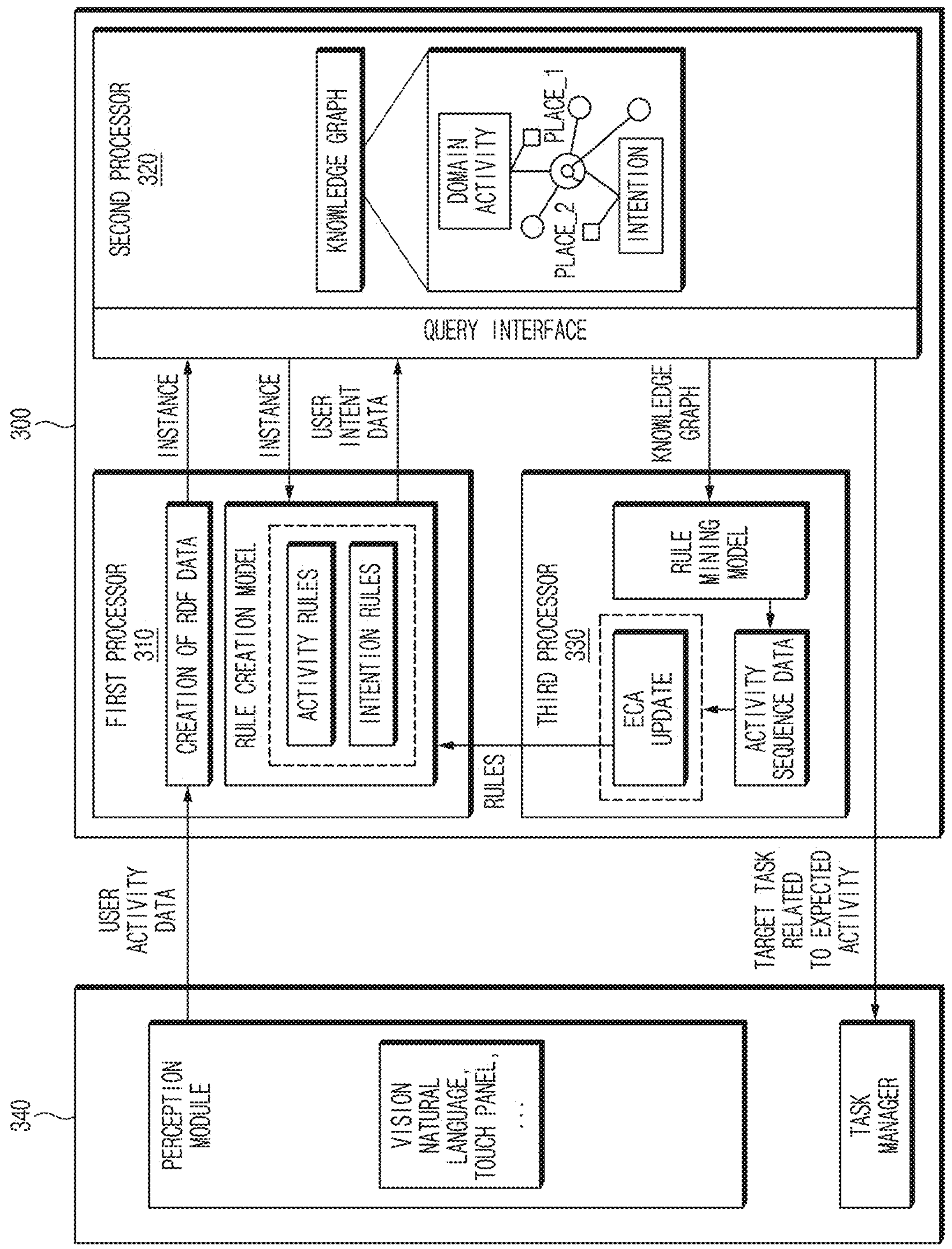
FIG. 3 is a block diagram showing a detailed configuration of a robot control apparatus, according to an embodiment of the present disclosure.

FIG. 3 is a block diagram showing a detailed configuration of a robot control apparatus, according to an embodiment of the present disclosure.

A robot control apparatus 300 according to an embodiment may receive user activity data perceived from a robot 340. The robot control apparatus 300 may control the robot 340 based on receiving the user activity data, through operations of FIGS. 4 to 9 described later such that the robot 340 performs a target task related to expected activity.

For example, the robot control apparatus 300 may include a first processor 310, a second processor 320, and a third processor 330. The first processor 310 may convert or create user activity data into resource description framework (RDF) data. The first processor 310 may output user intent data regarding the intent of the activity by applying an instance included in a knowledge graph to a rule creation model. The second processor 320 may store and manage the knowledge graph. The second processor 320 may exchange the instance or knowledge graph with the first processor 310 and the third processor 330. The third processor 330 may update an ECA rule through a rule mining model. In this specification, for convenience of description, the robot control apparatus 300 is described as including at least one processor, but is not limited thereto. For example, the robot control apparatus 300 may perform all operations of the first to third processors 310 to 330 through one processor, or any number of processors (together, separated, or integrated).

Figure 4:
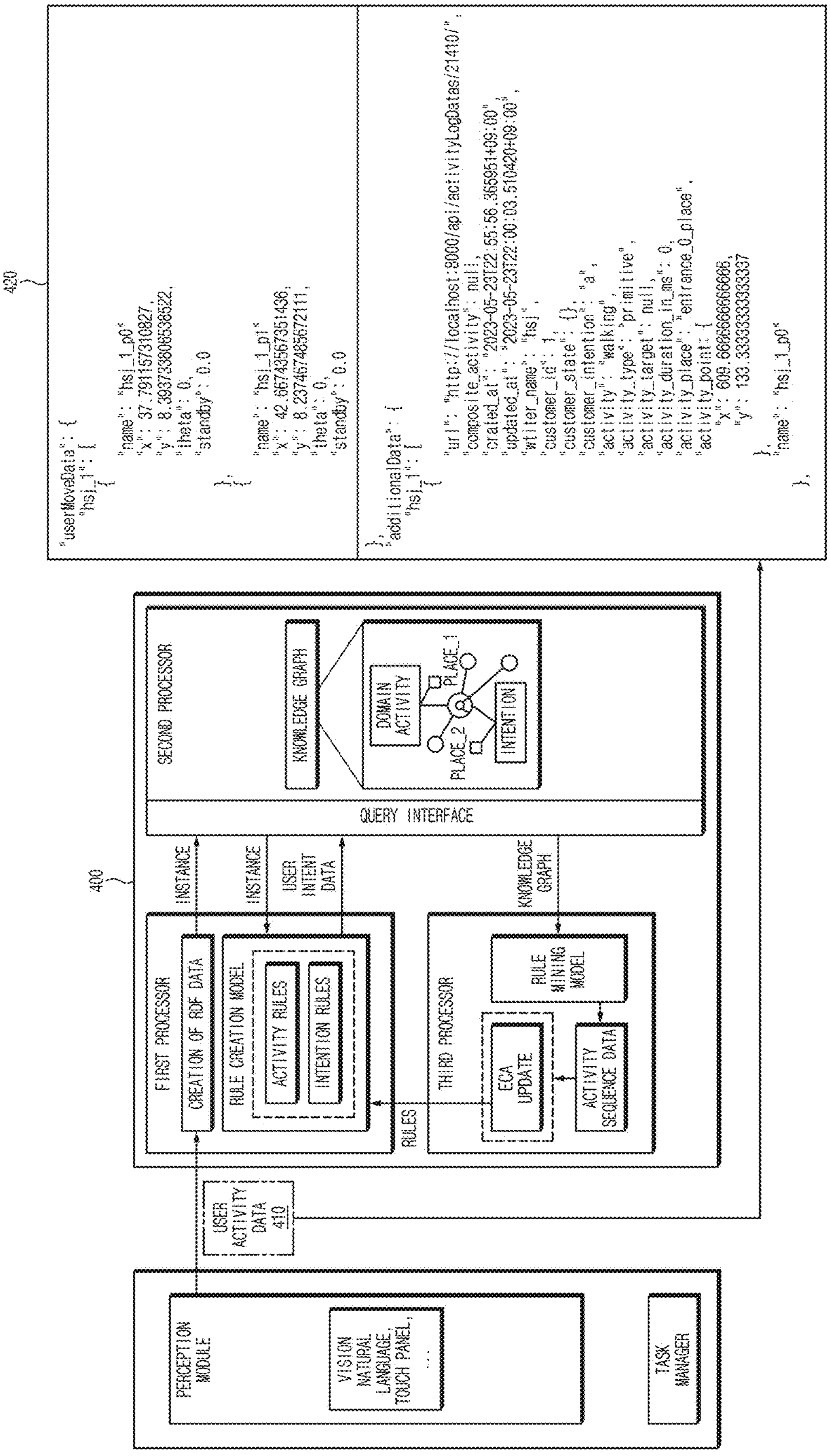
FIG. 4 is a diagram illustrating an example of user activity data received from a robot in a robot control apparatus, according to an embodiment of the present disclosure.

FIG. 4 is a diagram illustrating an example of user activity data received from a robot in a robot control apparatus, according to an embodiment of the present disclosure.

A robot control apparatus 400 according to an embodiment may receive user activity data 410 perceived from a robot. The robot control apparatus 400 may convert and/or create the user activity data 410 into RDF data through a first processor.

In particular, the robot may obtain information about the robot's external environment and a user by using a camera, a microphone, and a touch sensor, for example. The robot may perceive or recognize the user's basic activity based on the obtained information. For example, the activity of a user may include Standing, Sitting, Touching, Opening, Closing, and Walking. The user activity data 410 may indicate data in a form in which event information about the user's activity and context information about time and space, in which the activity occurs, are unstructured.

For example, the user activity data 410 may be stored in the robot control apparatus 400 as illustrated in data 420. For example, the data 420 may include at least one of the user's name, location, occurrence time, or activity type, or any combination thereof. Because the data 420 is data in an unstructured form, the data 420 may be converted and/or created into RDF data by the first processor.

Figure 5:
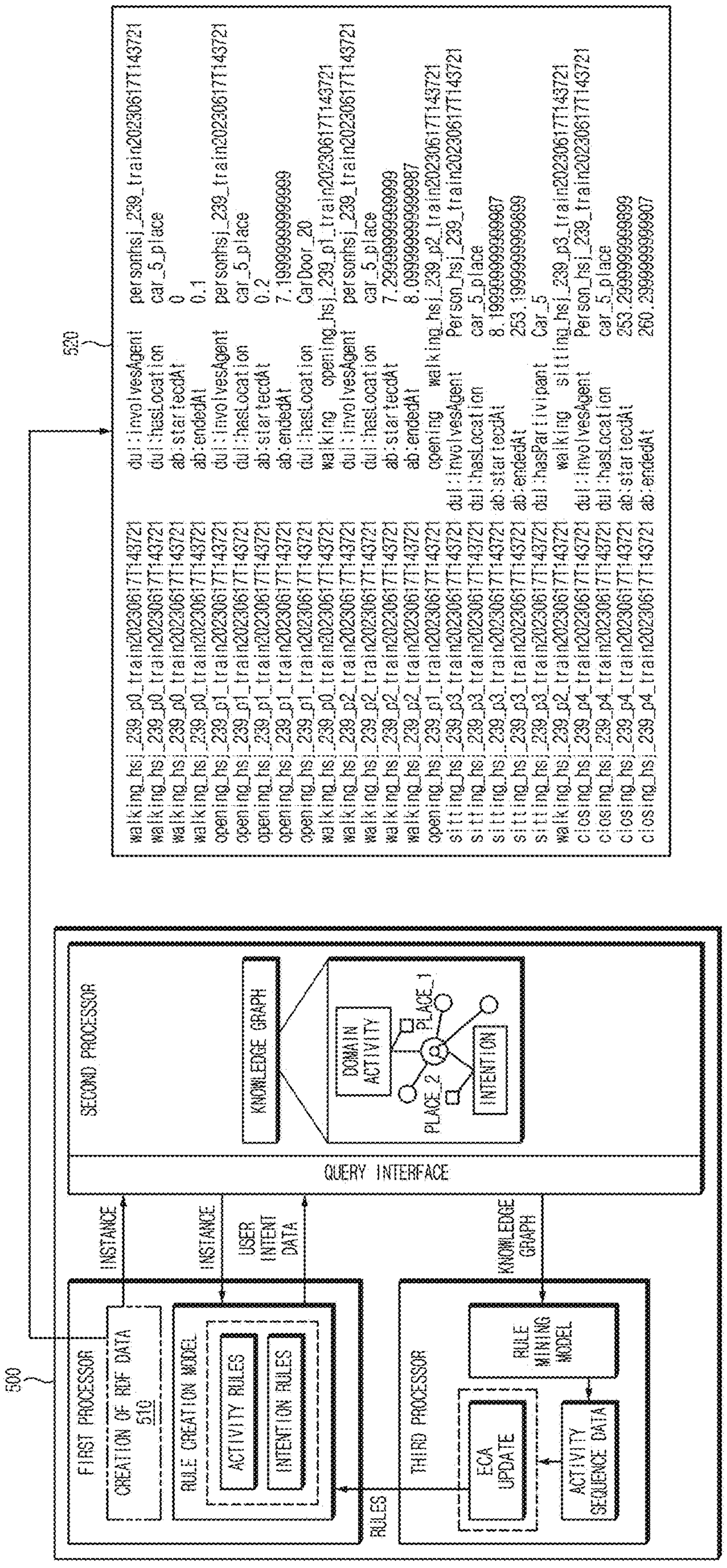
FIG. 5 is a diagram illustrating an example of RDF data generated from user activity data in a robot control apparatus, according to an embodiment of the present disclosure.

FIG. 5 is a diagram illustrating an example of RDF data generated from user activity data in a robot control apparatus, according to an embodiment of the present disclosure.

A robot control apparatus 500 according to an embodiment may convert user activity data into RDF data 510. In detail, the robot control apparatus 500 may convert the user activity data, which can be data in an unstructured form, into the RDF data 510, which can be data in a structured form, to store the RDF data 510 in a knowledge graph.

The robot control apparatus 500 may generate the RDF data 510, which can include a relation between event information and context information and which can be in a data format compatible with the ontology of the knowledge graph. For example, the RDF data 510 may indicate data including a subject entity, an object entity, and a predicate connecting the subject entity and the object entity. The robot control apparatus 500 may convert the RDF data 510 into an event instance and a context instance and may store the event instance and the context instance in the knowledge graph. For reference, the knowledge graph may indicate a graph formed by a connection relation between instances. In this specification, for convenience of description, an example of the RDF data 510 can be described as a triple 520.

Figure 6A:
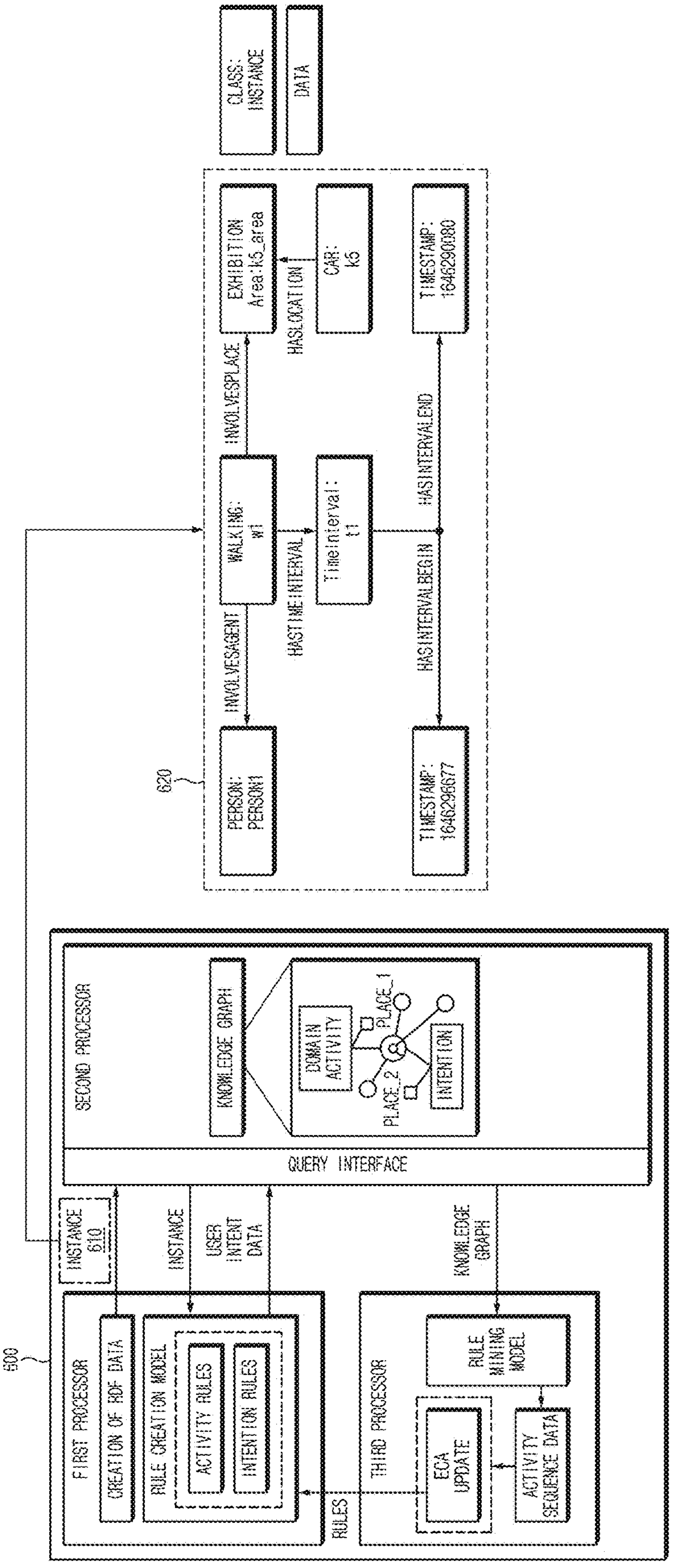
FIG. 6A is a diagram showing an example of instances stored in a knowledge graph in a robot control apparatus, according to an embodiment of the present disclosure.

FIG. 6A is a diagram showing an example of instances stored in a knowledge graph in a robot control apparatus, according to an embodiment of the present disclosure.

A robot control apparatus 600 according to an embodiment may store RDF data, which can be data in a triple form (a subject, a relation, and an object) input according to ontology, as an instance 610 of a knowledge graph. The robot control apparatus 600 may build the knowledge graph based on an event instance, and may store and utilize the knowledge graph to enable queries on the knowledge graph. For example, referring to FIG. 6, the graph 620 may include an exhibition area context instance and a time interval context instance, which express time and space information in a walking event instance. The instance may be inherited from a class, and detailed descriptions related thereto are given later.

Figure 6B:
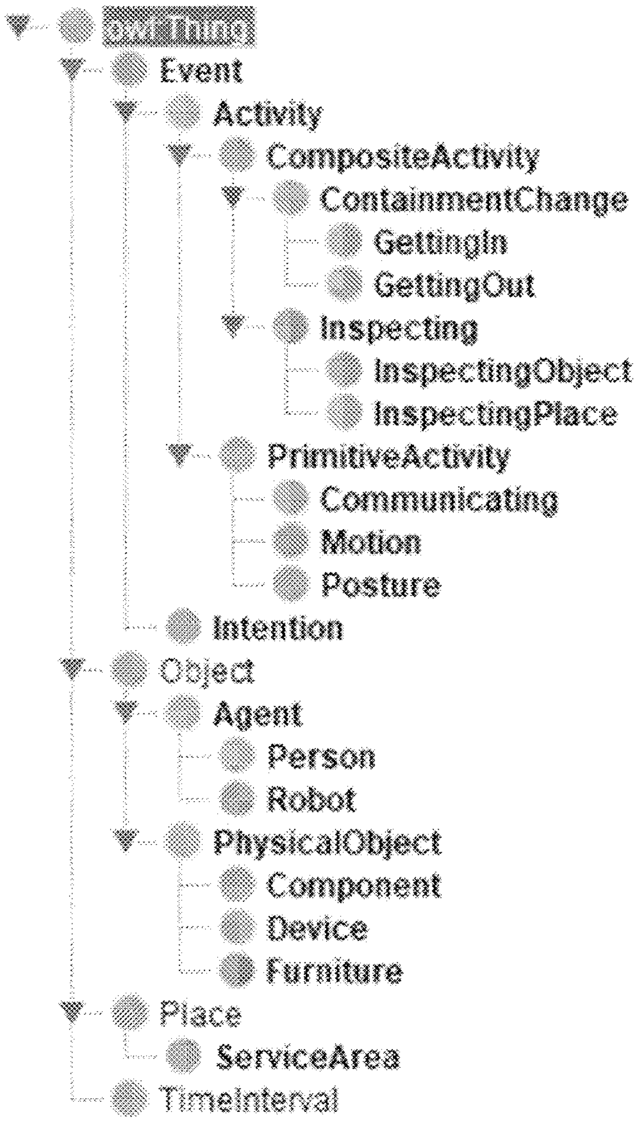
FIG. 6B is an example of a definition of a class of an ontology of a knowledge graph utilized by a robot control apparatus, according to an embodiment of the present disclosure.

For example, the definition of a class of the ontology of the knowledge graph utilized by the robot control apparatus 600 can be as shown in FIG. 6B. The ontology of the knowledge graph may form a domain-independent hierarchy and may provide a basic structure. For example, Event class, Object class, Place class, and TimeInterval class may be included at the top of the hierarchy (see e.g., FIG. 6B).

Referring to FIG. 6B, Event class may include two subclasses. For example, Event class may include Activity class and Intention class. Activity class may include PrimitiveActivity corresponding to unit activity and CompositeActivity, which can be composite activity obtained by integrating context information and a sequence of other activity. PrimitiveActivity class may be further classified into subclasses of communicating, motion, and posture. CompositeActivity class can include ContainmentChange subclass indicating a change in a containment relation. ContainmentChange subclass can include GettingIn and GettingOut. Another subclass of CompositeActivity may include Inspecting indicating inspecting a specific object or place. The class may be further classified into InspectingPlace and InspectingObject based on whether a place is inspected in detail, or whether an object is inspected in detail.

Still referring to FIG. 6B, Agent class may indicate an entity capable of becoming an actor in an event. Agent class may include two subclasses. In other words, Agent class may include Person class and Robot class. Person class may indicate a customer and an employee of an automobile exhibition hall. Robot class may indicate a service robot. PhysicalObject class may indicate an entity capable of participating in an event. PhysicalObject class may be divided into several subclasses: Car, Component, Device, Furniture, InformationMap. Component class can include CarComponent subclass. CarComponent subclass can include CarDoor subclass and CarTrunk subclass. Component class also can include RobotComponent subclass.

Figure 6C:
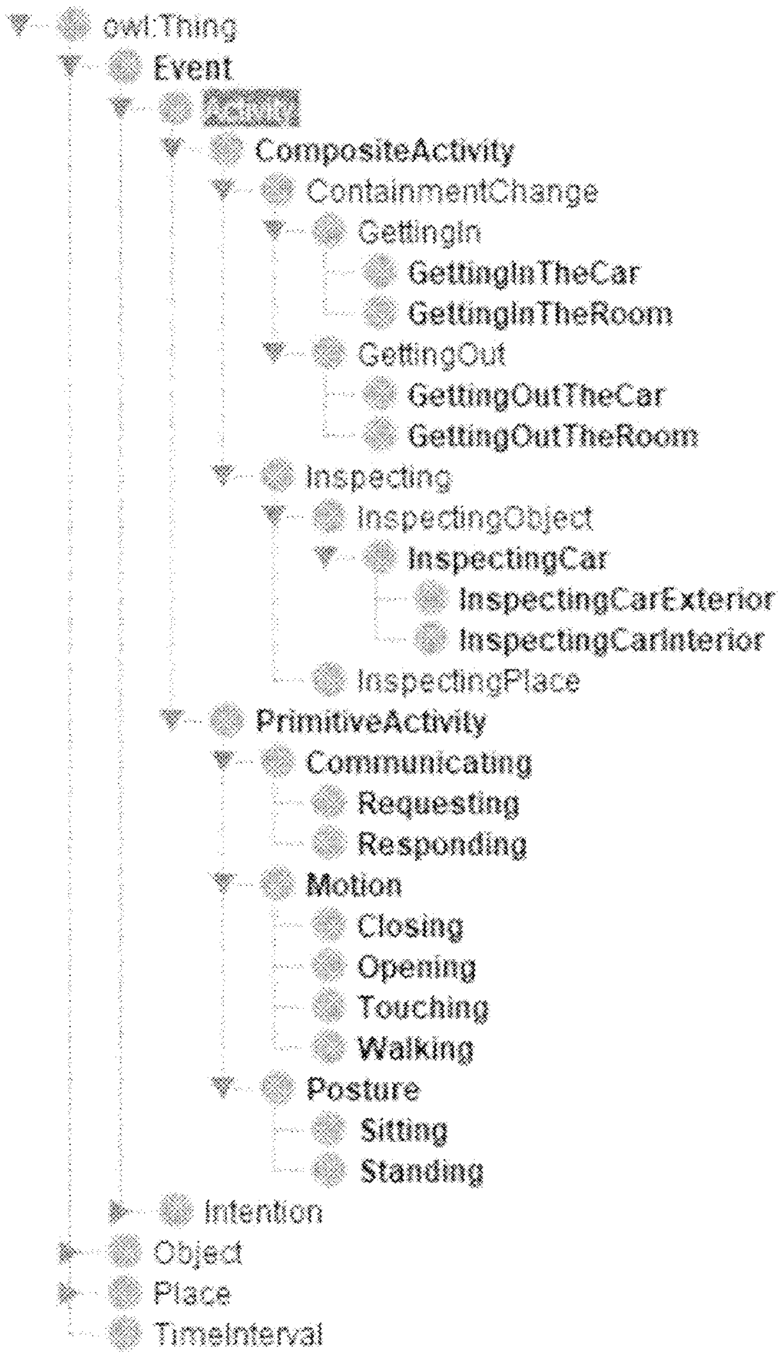
FIG. 6C is an example of a definition of a class of an ontology of a knowledge graph utilized by a robot control apparatus, according to an embodiment of the present disclosure.

A more specific definition of Event class of the knowledge graph utilized by the robot control apparatus 600 can be as shown in FIG. 6C, for example. Referring to FIG. 6*c*, Event class may include an extended hierarchy of PrimitiveActivity class including Communicating subclasses such as Requesting and Responding, Motion subclasses such as Opening, Closing, Touching, and Walking, and Posture subclasses such as Sitting and Standing.

As mentioned above, the robot control apparatus 600 may inherit or create an instance from each class based on the type of a predefined class. Referring to graph 620 in FIG. 6A, w1 event instance may indicate an instance inherited from walking class, and person 1 instance may indicate an instance inherited from person class. In this way, the robot control apparatus 600 may create or manage a knowledge graph based on a relation between instances inherited from each class.

Figure 7:
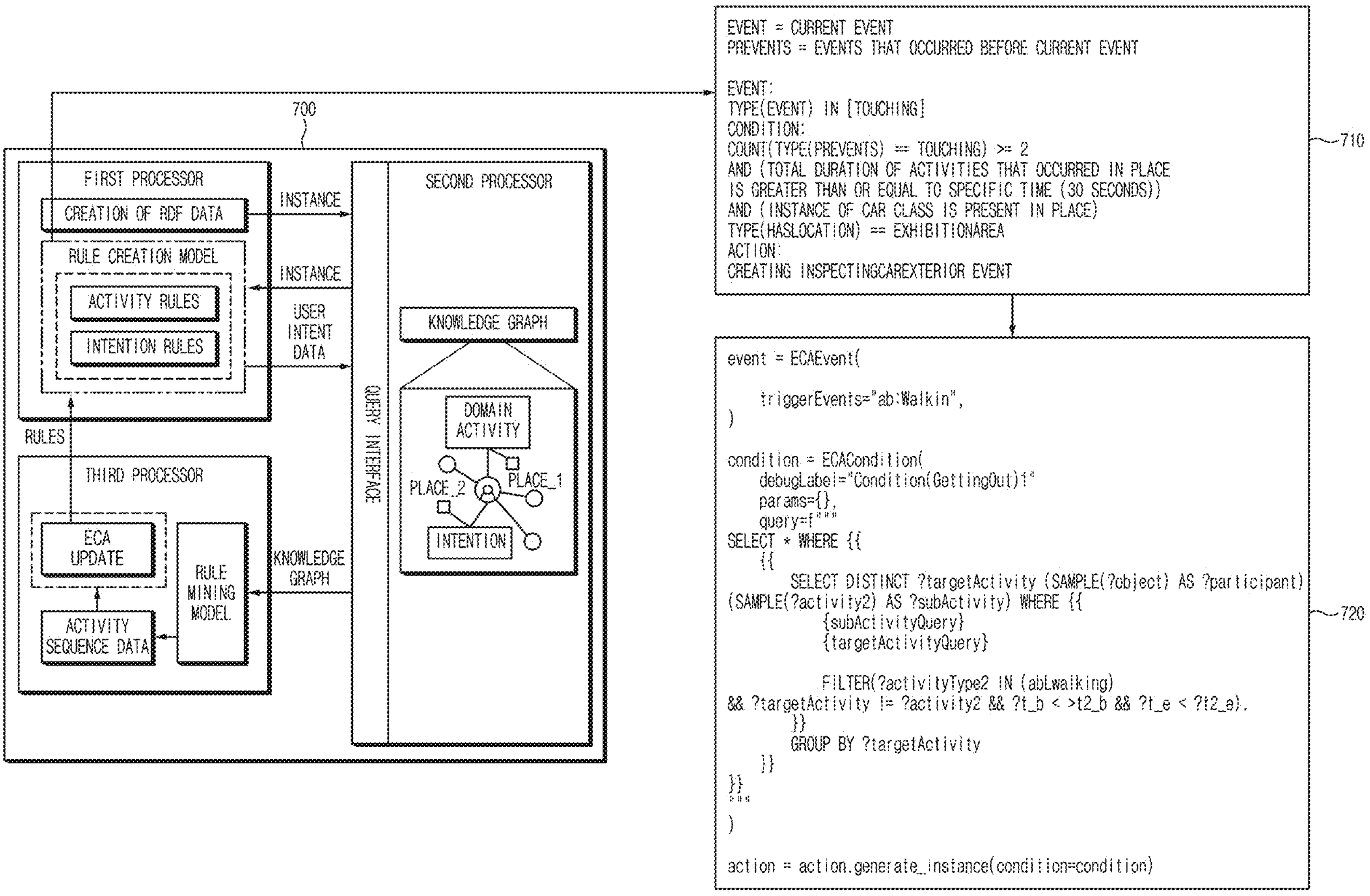
FIG. 7 is a diagram illustrating an example of obtaining user intent data through an ECA rule in a robot control apparatus, according to an embodiment of the present disclosure.

FIG. 7 is a diagram illustrating an example of obtaining user intent data through an ECA rule in a robot control apparatus, according to an embodiment of the present disclosure.

A robot control apparatus 700 according to an embodiment may identify a predetermined ECA rule 710 from a rule creation model based on applying an event instance to the rule creation model. The robot control apparatus 700 may obtain a condition regarding the event instance by applying the event instance to the ECA rule. For example, the robot control apparatus 700 may obtain a condition corresponding to the applied event instance. The robot control apparatus 700 may obtain user intent data by applying a context instance paired with an event instance to the condition.

In detail, the robot control apparatus 700 may apply the context instance to the condition of the ECA rule 710. The context instance can include a place where the event instance occurs, the time at which the event instance occurs, and the cause of the occurrence, and thus the context instance may be applied to the condition of the ECA rule 710. As such, the robot control apparatus 700 may perform more sophisticated inference than inference considering only the event instance, by using not only the event instance but also a context instance to infer intent through the ECA rule 710.

The robot control apparatus 700 may obtain user intent data based on applying the event instance and the context instance to the ECA rule 710. Referring to FIG. 7, the user intent data may include a vehicle exterior inspection event, such as InspectingCarExterior. In this way, the robot control apparatus 700 may output the vehicle exterior inspection event such as InspectingCarExterior from an event instance (at the same time, the user's activity), such as touching, by using the context instance.

For example, the ECA rule 710 may be stored in the robot control apparatus 700 as illustrated in data 720. For example, the data 720 may include a final output through the input of an event instance, which can be a trigger, a condition corresponding to the input event instance, and the inspection of the condition.

Figure 8:
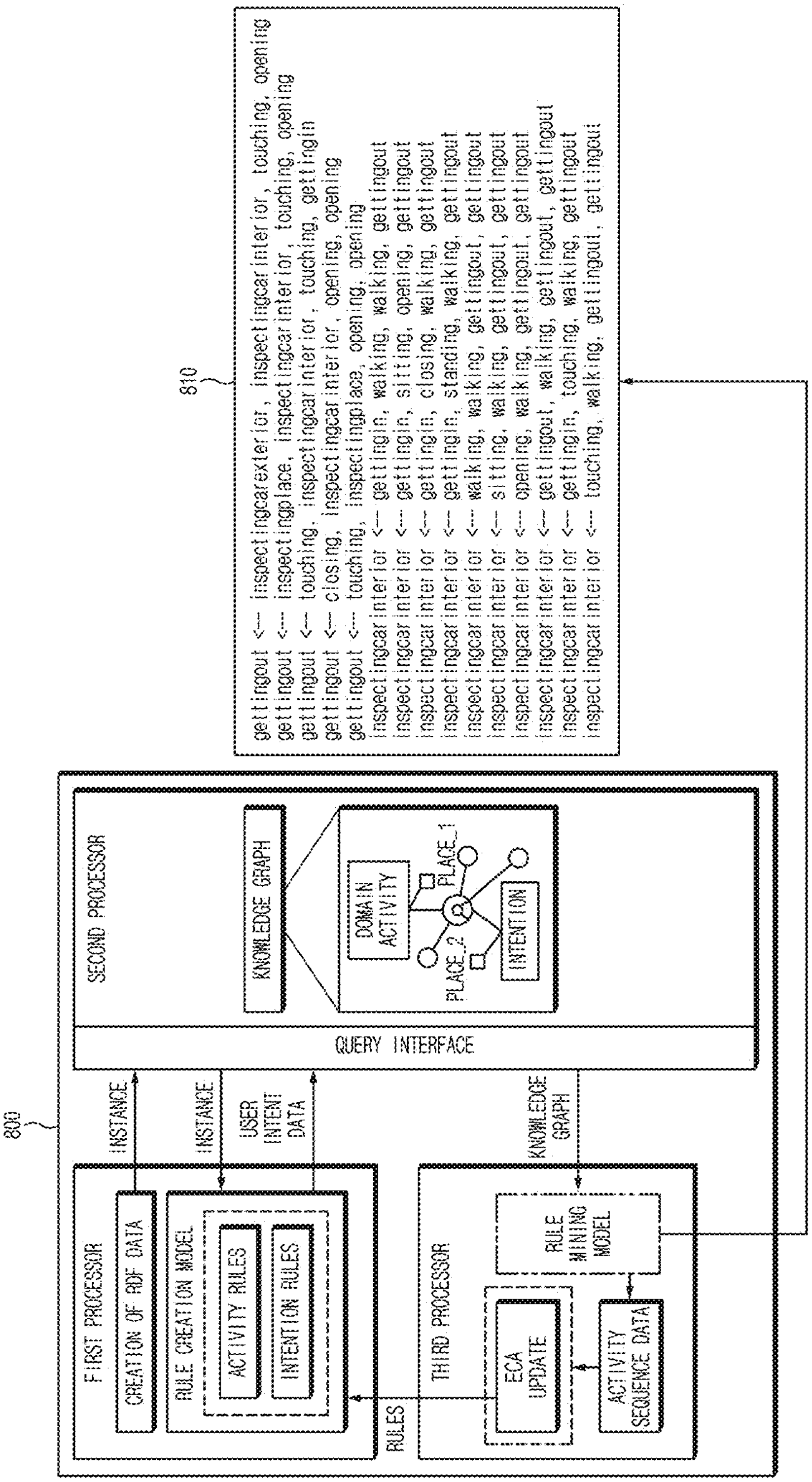
FIG. 8 is a diagram illustrating an example of an output of a rule mining model in a robot control apparatus, according to an embodiment of the present disclosure.

FIG. 8 is a diagram illustrating an example of an output of a rule mining model in a robot control apparatus, according to an embodiment of the present disclosure.

A robot control apparatus 800 according to an embodiment may identify a neural compositional rule learning (NCRL)-based rule mining model that generates user intent data regardless of a context instance based on an event instance among instances included in a knowledge graph from a rule creation model. The robot control apparatus 800 may update an ECA rule based on an output 810 of the rule mining model and the knowledge graph.

When at least one event instance (e.g., a touching event instance) is entered, the rule mining model may indicate a model for outputting the obtaining (e.g., gettingout event instance) of user intent data corresponding to input data. This rule mining model, unlike the ECA rule, may be a model that outputs the user intent data by using only event instances without a context instance.

The robot control apparatus 800 may obtain activity sequence data related to an event instance from the rule mining model. The robot control apparatus 800 may obtain at least one candidate context instance related to the activity sequence data from the knowledge graph. For example, the robot control apparatus 800 may obtain the activity sequence data including gettingout event instance corresponding to inspectingcarexterior, inspectingcarinterior, touching, and opening event instances as activity sequence data regarding the event instance from the rule mining model. The robot control apparatus 800 may obtain a candidate context instance paired with an event instance included in the activity sequence data from the knowledge graph. In detail, the event instance may be stored in the knowledge graph in the form paired with the context instance. A method for updating the ECA rule through the paired candidate context instance is described in detail in FIG. 9 below.

The robot control apparatus 800 may update the ECA rule based on the activity sequence data and the at least one candidate context instance.

Figure 9:
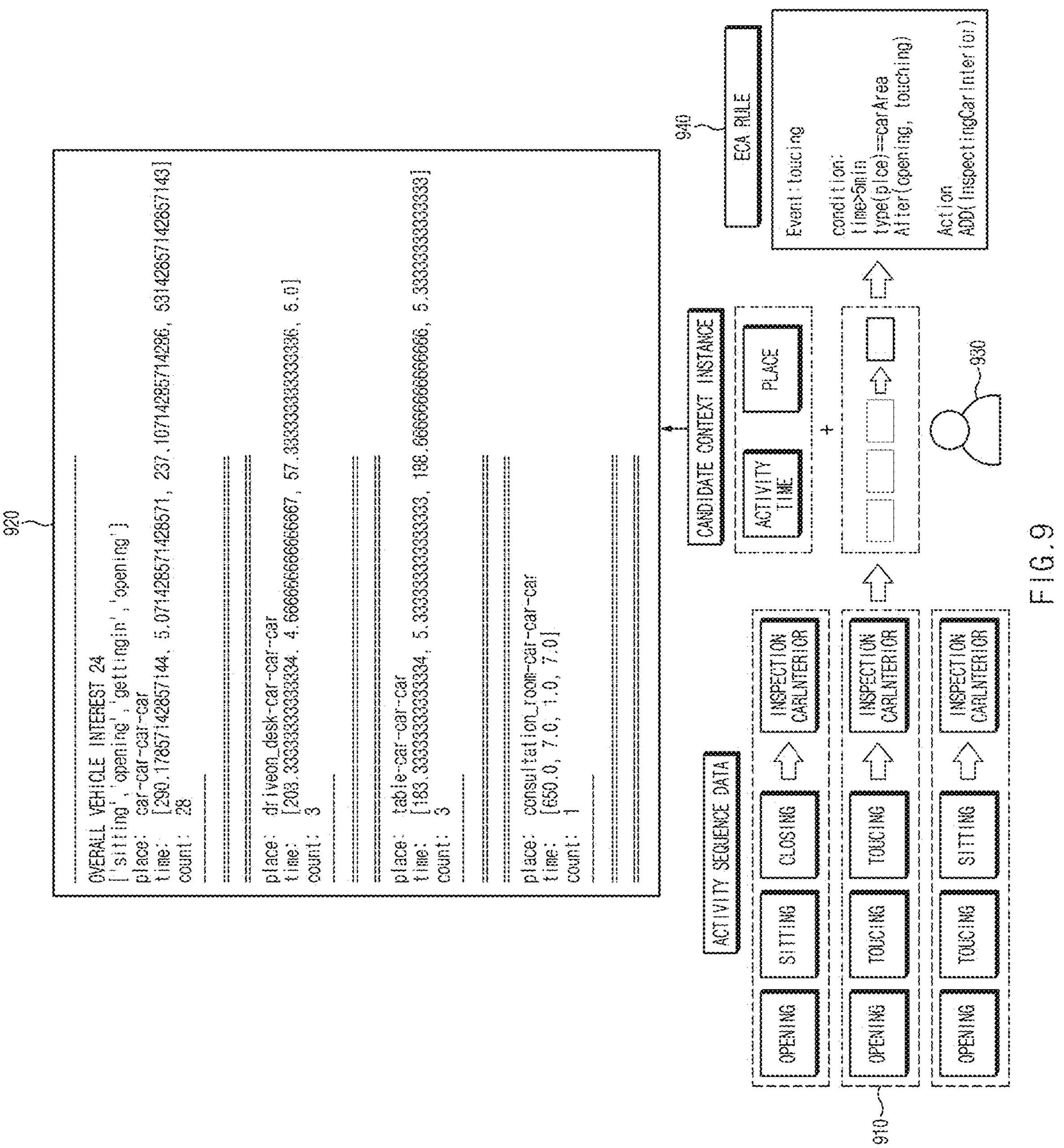
FIG. 9 is a diagram illustrating an example of an operation of updating an ECA rule in a robot control apparatus, according to an embodiment of the present disclosure.

FIG. 9 is a diagram illustrating an example of an operation of updating an ECA rule in a robot control apparatus, according to an embodiment of the present disclosure.

A robot control apparatus (e.g., the robot control apparatus 100 in FIG. 1) according to an embodiment may obtain at least one activity sequence data from a rule mining model. The robot control apparatus may identify target activity sequence data 910 among at least one activity sequence data. For example, when an event instance of opening, touching, and touching is present, the target activity sequence data 910 may indicate data including an inspecting carInterior event instance corresponding to the above-described event instances.

The robot control apparatus may obtain at least one candidate context instance related to the target activity sequence data 910 from the knowledge graph based on identifying the target activity sequence data 910. For example, the clustering result 920 may include at least one candidate context instance.

The robot control apparatus may identify a first candidate context instance and a second candidate context instance different from the first candidate context instance from at least one candidate context instance. The robot control apparatus may determine a first count indicating the number of targets satisfying the combination of a place (e.g., car-car-car-car) included in the first candidate context instance and the target activity sequence data 910. The robot control apparatus may determine a second count indicating the number of targets satisfying the combination of a place (e.g., driveon_desk-car-car-car) included in the second candidate context instance and the target activity sequence data 910.

For example, referring to the clustering result 920, the place and event occurrence time of at least one candidate context instance related to the target activity sequence data 910 are shown.

The robot control apparatus may determine one of the first candidate context instance or the second candidate context instance as a target context instance for the activity sequence data based on the comparison of the first count and the second count. Referring to FIG. 9, the robot control apparatus may determine the first candidate context instance regarding the first count, which can be the higher of the first count (e.g., 28) and the second count (e.g., 3), as the target context instance. However, a method for determining the target context instance is not limited thereto. For example, an expert 930 may identify the clustering result 920 and may determine one of the candidate context instances included in the clustering result 920 as the target context instance.

The robot control apparatus may update an ECA rule 940 by inserting a relation between activity sequence data and the target context instance into the ECA rule 940 based on the fact that the target context instance (e.g., in FIG. 9, a context instance with a count of 28) regarding the target activity sequence data 910 is determined.

The robot control apparatus may obtain an additional condition regarding an instance of event information by applying the instance of event information to the ECA rule 940 based on the ECA rule 940 being updated and may obtain additional user intent data different from the user intent data by applying an instance regarding context information paired with the event information to the additional condition. The robot control apparatus may determine a target task related to expected activity based on the user intent data (i.e., an action inferred from the ECA rule before the update) and the additional user intent data (i.e., an action inferred from the ECA rule after the update) and may control the robot such that the robot performs the target task.

Figure 10:
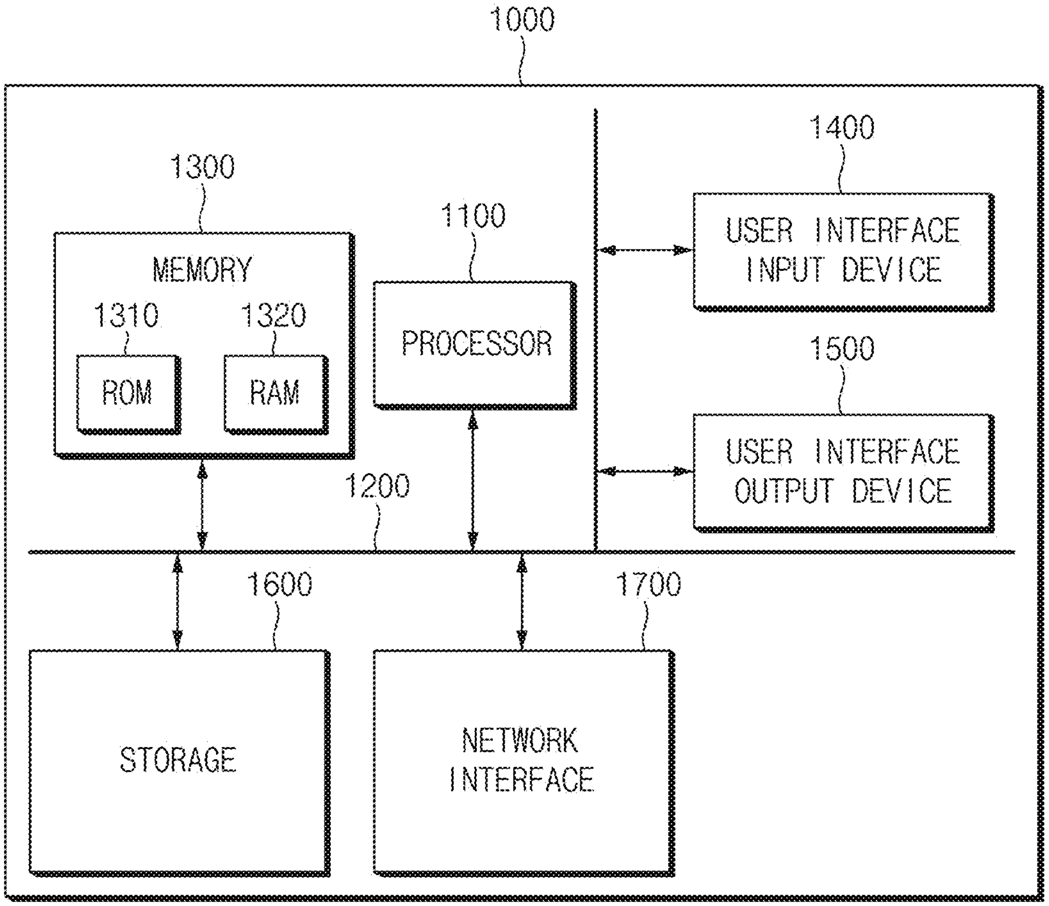
FIG. 10 is a diagram illustrating a computing system related to a robot control apparatus or a robot control method, according to an embodiment of the present disclosure.

FIG. 10 is a diagram illustrating a computing system related to a robot control apparatus or a robot control method, according to an embodiment of the present disclosure.

Referring to FIG. 10, a computing system 1000 related to a robot control apparatus or a robot control method may include at least one processor 1100, a memory 1300, a user interface input device 1400, a user interface output device 1500, a storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, as a storage medium, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM), or any combination thereof.

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of technical ideas of embodiments of the present disclosure, and various modifications and modifications may be made by one skilled in the art without departing from the essential characteristic of the present disclosure.

The above-described example embodiments may be implemented with hardware elements, software elements, and/or a combination of hardware elements and software elements. For example, the devices, methods, and components described in embodiments of the present disclosure may be implemented by using general-use computers or special-purpose computers, such as a processor, a controller, an arithmetic logic unit (ALU), a digital signal processor, a microcomputer, a field programmable array (FPA), a programmable logic unit (PLU), a microprocessor, or any device which may execute instructions and respond. A processing device may perform an operating system (OS) or a software application running on the OS. Further, the processing device may access, store, manipulate, process and generate data in response to execution of software. It can be understood by those skilled in the art that although a single processing device may be illustrated for convenience of understanding, the processing device may include a plurality of processing elements and/or a plurality of types of processing elements. For example, the processing device may include a plurality of processors or one processor and one controller. Also, the processing device may include a different processing configuration, such as a parallel processor.

Software may include computer programs, codes, instructions or one or more combinations thereof and configure a processing device to operate in a desired manner or independently or collectively control the processing device. Software and/or data may be permanently or temporarily embodied in any type of machine, components, physical equipment, virtual equipment, computer storage media or units or transmitted signal waves so as to be interpreted by the processing device or to provide instructions or data to the processing device. Software may be dispersed throughout computer systems connected over networks and be stored or executed in a dispersion manner. Software and data may be recorded in a computer-readable storage medium.

The methods according to the above-described embodiments may be recorded in a computer-readable medium including program instructions that are executable through various computer devices. The computer-readable medium may also include program instructions, data files, data structures, or a combination thereof. The program instructions recorded in the medium may be designed and configured specially for the embodiments of the present disclosure or may be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like.

The hardware device described above may be configured to act as one or more software modules to perform the operations of the above-described example embodiments of the present disclosure, or vice versa.

Even though the embodiments are described with reference to restricted drawings, one skilled in the art can realize that the embodiments can be variously changed or modified based on the above description. For example, adequate effects may be achieved even when the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims can be within the scopes of the following claims.

Accordingly, example embodiments of the present disclosure are intended not to necessarily limit but to explain technical ideas of the present disclosure, and the scopes and spirit of the present disclosure are not necessarily limited by the above example embodiments. The scopes of protection of the present disclosure can be construed by the attached claims, and all equivalents thereof can be construed as being included within the scopes of the present disclosure.

According to at least one of embodiments of the present disclosure, it can be possible to provide excellent advantages by using inference of considering a user's activity and a situation, in which the activity occurs, compared to the effect of inferring intent by using only the user's activity by inferring the user's intent through a rule creation model based on the event instance and context instance included in a knowledge graph.

Moreover, according to at least one of embodiments of the present disclosure, it can be possible to reduce the time and cost required to obtain domain knowledge and, at the same time, combining knowledge-driven and data-driven approaches to create expressive rules by updating an ECA rule based on the output of a rule mining model and a knowledge graph.

Furthermore, according to at least one of embodiments of the present disclosure, it can be possible to increase intent perception performance through the discovery of previously undiscovered rules by inferring the user's intent based on user intent data obtained from the ECA rule and additional user intent data obtained from the updated ECA rule, rather than inferring the user's intent based on the output of the rule mining model.

Besides, a variety of advantages directly or indirectly understood through the present disclosure may be provided.

Hereinabove, although the present disclosure was described with reference to example embodiments and the accompanying drawings, the present disclosure is not necessarily limited thereto, but may be variously modified and altered by those skilled in the art to which the present disclosure pertains without departing from the spirit and scopes of the present disclosure claimed in the following claims.

What is claimed is:

1. A robot control apparatus comprising:

at least one processor; and a storage medium storing computer-readable instructions that, when executed by the at least one processor, cause the at least one processor to:

apply event information about user activity of a user, which is identified from user activity data perceived from a robot, and context information about time and space, in which the user activity occurs, to a knowledge graph formed by a relation between an event instance regarding the event information and a context instance regarding the context information;

identify, from a rule creation model, an event-condition-action (ECA) rule corresponding to the event instance;

obtain first user intent data by applying the event instance and the context instance to the ECA rule;

identify, from the rule creation model, a neural compositional rule (NCRL)-based mining model configured to generate activity sequence data based on the event instance regardless of the context instance;

update the ECA rule based on an output of the NCRL-based rule mining model and the knowledge graph;

obtain additional user intent data by mapping the event instance and the context instance to the updated ECA rule; and control the robot such that the robot performs a target task related to an expected activity, which follows the user activity, based on the first user intent data and the additional user intent data.

2. The apparatus of claim 1, wherein the instructions further cause the at least one processor to:

obtain a condition regarding the event instance by applying the event instance to the ECA rule.

3. The apparatus of claim 1, wherein the instructions further enable the at least one processor to:

obtain the activity sequence data regarding the event instance generated by the NCRL-based rule mining model;

obtain at least one candidate context instance related to the activity sequence data from the knowledge graph; and update the ECA rule based on the activity sequence data and the at least one candidate context instance.

4. The apparatus of claim 3, wherein the instructions further cause the at least one processor to:

identify a first candidate context instance and a second candidate context instance different from the first candidate context instance from the at least one candidate context instance;

determine a first count, which is a first number of first targets satisfying combination of a first place included in the first candidate context instance and the activity sequence data;

determine a second count, which is a second number of second targets satisfying combination of a second place included in the second candidate context instance and the activity sequence data; and determine one of the first candidate context instance or the second candidate context instance as a target context instance regarding the activity sequence data based on comparing the first count with the second count.

5. The apparatus of claim 4, wherein the instructions further cause the at least one processor to:

update the ECA rule by inserting a relation between the activity sequence data and the target context instance into the ECA rule based on the target context instance regarding target activity sequence data being determined.

6. The apparatus of claim 1, wherein the instructions further cause the at least one processor to:

obtain an additional condition regarding an instance of the event information by applying the instance of the event information to the ECA rule based on the ECA rule being updated; and obtain additional user intent data different from the first user intent data by applying an instance regarding context information paired with the event information to the additional condition.

7. The apparatus of claim 6, wherein the instructions further cause the at least one processor to:

determine the target task related to the expected activity based on the first user intent data and the additional user intent data; and control the robot such that the robot performs the target task.

8. The apparatus of claim 1, wherein the instructions further cause the at least one processor to:

generate resource description framework (RDF) data, which includes a relation between the event information and the context information and which is in a data format compatible with ontology of the knowledge graph; and convert the RDF data into the event instance and the context instance and store the event instance and the context instance in the knowledge graph.

9. A robot control method, the method comprising:

applying event information about user activity of a user, which is identified from user activity data perceived from a robot, and context information about time and space, in which the user activity occurs, to a knowledge graph formed by a first relation between an event instance regarding the event information and a context instance regarding the context information;

identifying, from a rule creation model, an event-condition-action (ECA) rule corresponding to the event instance;

obtaining first user intent data by applying the event instance and the context instance to the ECA rule;

identifying, from the rule creation model, a neural compositional rule learning (NCRL)-based rule mining model configured to generate activity sequence data based on the event instance regardless of the context instance;

updating the ECA rule based on an output of the NCRL-based rule mining model and the knowledge graph;

obtaining additional user intent data by applying the event instance and the context instance to the updated ECA rule; and controlling the robot such that the robot performs a target task related to an expected activity, which follows the user activity, based on the first user intent data and the additional user intent data.

10. The method of claim 9, further comprising obtaining a condition regarding the event instance by applying the event instance to the ECA rule.

11. The method of claim 9, wherein the updating of the ECA rule comprises:

obtaining activity sequence data regarding the event instance from the NCRL-based rule mining model;

obtaining at least one candidate context instance related to the activity sequence data from the knowledge graph; and updating the ECA rule based on the activity sequence data and the at least one candidate context instance.

12. The method of claim 11, wherein the updating of the ECA rule further comprises:

identifying a first candidate context instance and a second candidate context instance different from the first candidate context instance from the at least one candidate context instance;

determining a first count, which is a first number of targets satisfying combination of a first place included in the first candidate context instance and the activity sequence data;

determining a second count, which is a second number of targets satisfying combination of a second place included in the second candidate context instance and the activity sequence data; and determining one of the first candidate context instance or the second candidate context instance as a target context instance regarding the activity sequence data based on comparing the first count with the second count.

13. The method of claim 12, wherein the updating of the ECA rule further comprises updating the ECA rule by inserting a second relation between the activity sequence data and the target context instance into the ECA rule based on the target context instance regarding target activity sequence data being determined.

14. The method of claim 9, wherein the obtaining of the additional user intent data further comprises:

obtaining an additional condition regarding an instance of the event information by applying the instance of the event information to the ECA rule based on the ECA rule being updated; and obtaining additional user intent data different from the first user intent data by applying an instance regarding context information paired with the event information to the additional condition.

15. The method of claim 14, wherein the controlling of the robot comprises:

determining the target task related to the expected activity based on the first user intent data and the additional user intent data; and controlling the robot such that the robot performs the target task.

16. The method of claim 9, further comprising:

generating resource description framework (RDF) data, which includes a third relation between the event information and the context information and which is in a data format compatible with ontology of the knowledge graph; and converting the RDF data into the event instance and the context instance and storing the event instance and the context instance in the knowledge graph.

17. A robot control method, the method comprising:

applying event information about user activity of a user, which is identified from user activity data perceived from a robot, and context information about time and space, in which the user activity occurs, to a knowledge graph formed by a first relation between an event instance regarding the event information and a context instance regarding the context information;

generating resource description framework (RDF) data, which includes a third relation between the event information and the context information and which is in a data format compatible with ontology of the knowledge graph;

converting the RDF data into the event instance and the context instance and storing the event instance and the context instance in the knowledge graph;

identifying, from a rule creation model, an event-condition-action (ECA) rule corresponding to the event instance;

obtaining first user intent data by applying the event instance and the context instance to the ECA rule;

identifying, from the rule creation model, a neural compositional rule learning (NCRL)-based rule mining model configured to generate activity sequence data based on the event instance regardless of the context instance;

updating the ECA rule based on an output of the NCRL-based rule mining model and the knowledge graph;

obtaining additional user intent data by applying the event instance and the context instance to the updated ECA rule;

and controlling the robot such that the robot performs a target task related to an expected activity, which follows the user activity, based on the first user intent data and the additional user intent data.

18. The method of claim 17, wherein the updating of the ECA rule comprises:

obtaining activity sequence data regarding the event instance from the NCRL-based rule mining model;

obtaining at least one candidate context instance related to the activity sequence data from the knowledge graph;

updating the ECA rule based on the activity sequence data and the at least one candidate context instance;

identifying a first candidate context instance and a second candidate context instance different from the first candidate context instance from the at least one candidate context instance;

determining a first count, which is a first number of targets satisfying combination of a first place included in the first candidate context instance and the activity sequence data;

determining a second count, which is a second number of targets satisfying combination of a second place included in the second candidate context instance and the activity sequence data;

determining one of the first candidate context instance or the second candidate context instance as a target context instance regarding the activity sequence data based on comparing the first count with the second count;

updating the ECA rule by inserting a second relation between the activity sequence data and the target context instance into the ECA rule based on the target context instance regarding target activity sequence data being determined;

obtaining an additional condition regarding an instance of the event information by applying the instance of the event information to the ECA rule based on the ECA rule being updated; and obtaining additional user intent data different from the first user intent data by applying an instance regarding context information paired with the event information to the additional condition.

19. The method of claim 17, wherein the knowledge graph comprises an ontology having a class hierarchy including an Event class, an Agent class, a Place class, and a TimeInterval class.

20. The method of claim 17, wherein the RDF data is in a triple form comprising a subject entity, an object entity, and a predicate connecting the subject entity and the object entity, and wherein the RDF data is converted from unstructured user activity data.

* * * * *